May 4, 1926.
F. C. D. WILKES ET AL
1,583,510
TOPPING DEVICE FOR SUGAR CANE HARVESTERS
Filed August 3, 1922    2 Sheets-Sheet 1
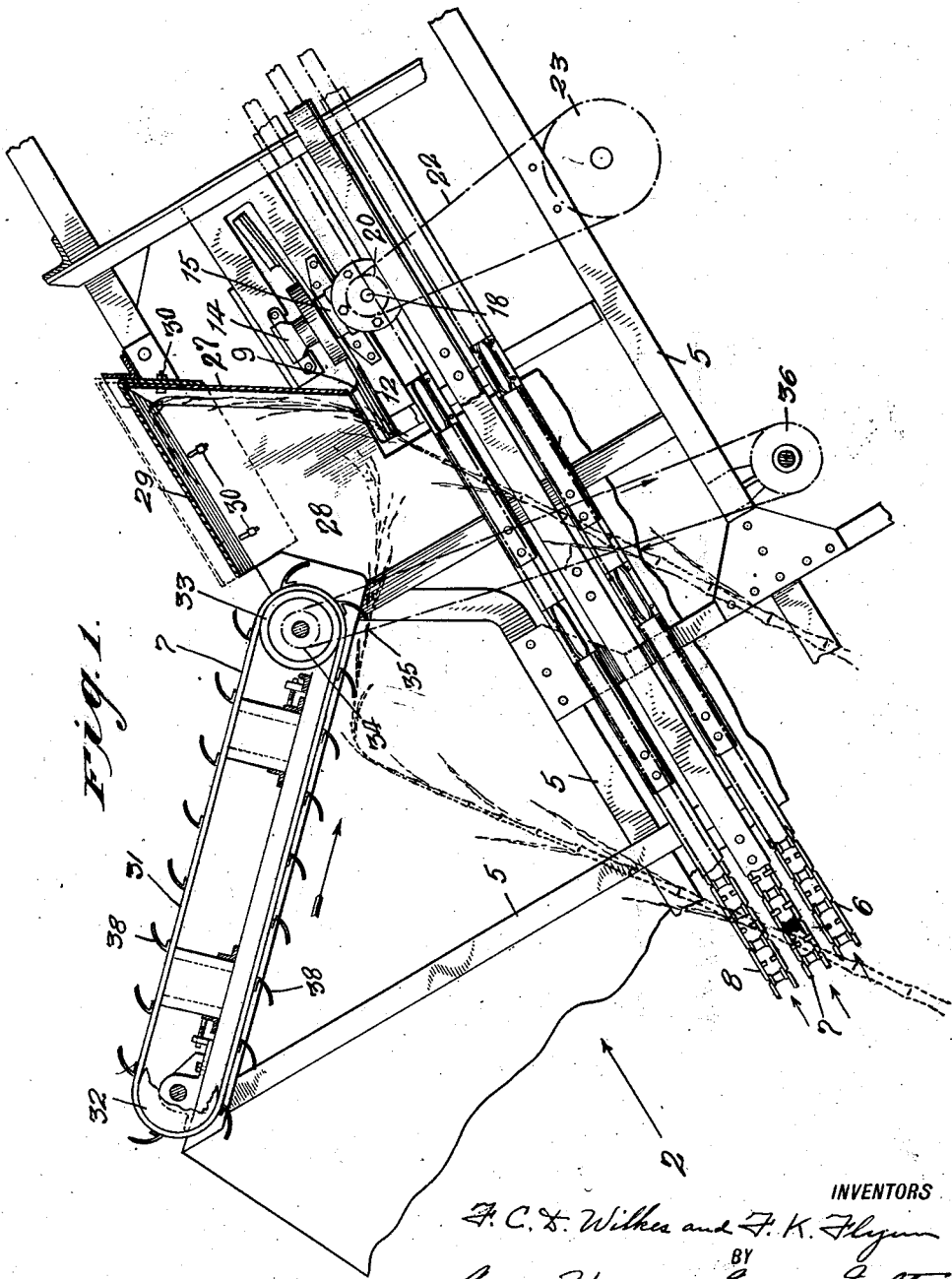
INVENTORS
F. C. D. Wilkes and F. K. Flynn
BY
ATTORNEYS May 4, 1926.
F. C. D. WILKES ET AL
1,583,510
TOPPING DEVICE FOR SUGAR CANE HARVESTERS
Filed August 3, 1922　　2 Sheets-Sheet 2
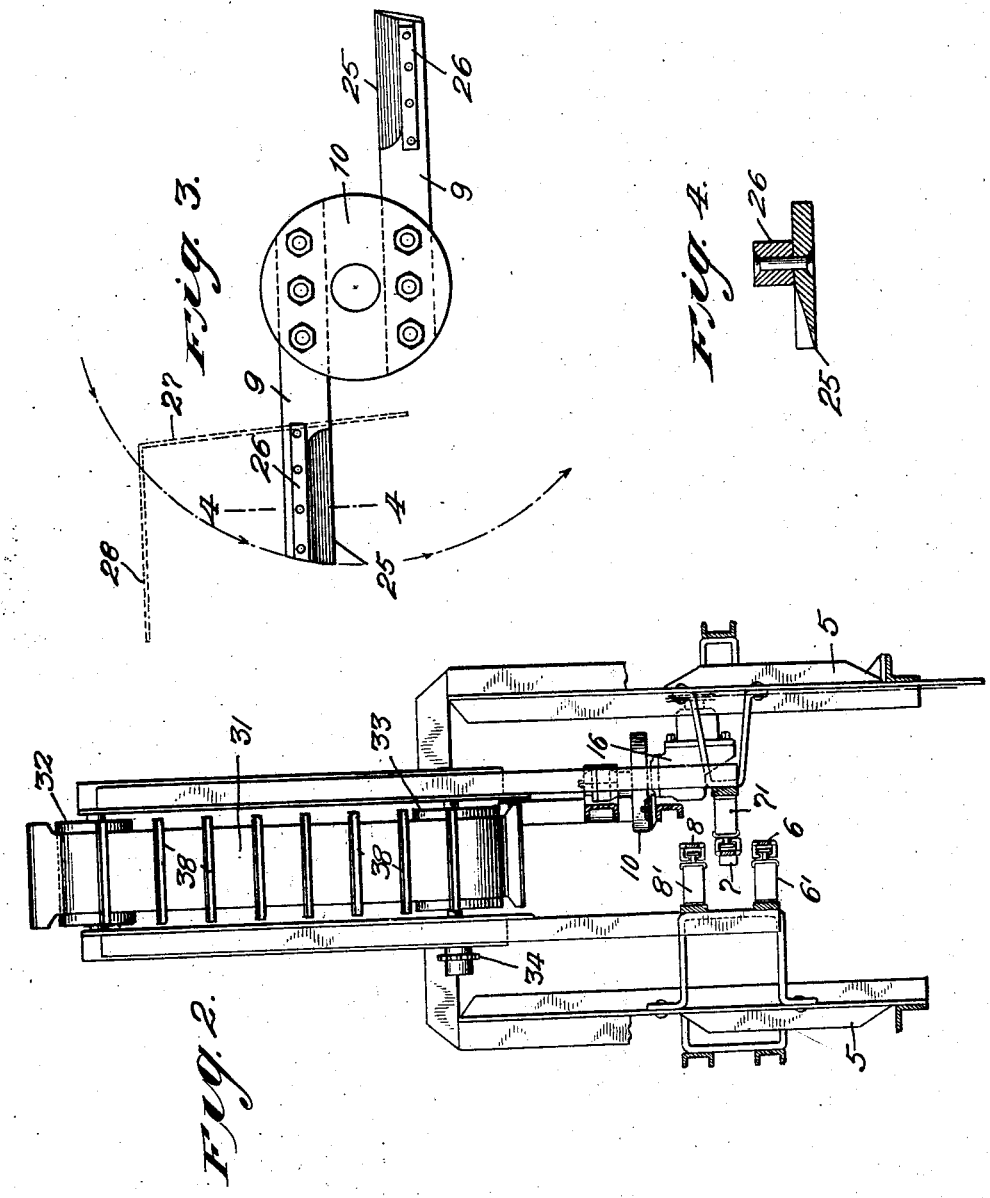
INVENTORS Patented May 4, 1926.

1,583,510

UNITED STATES PATENT OFFICE.

FREDERICK C. DOUGLAS WILKES AND FRANCIS K. FLYNN, OF NEW YORK, N. Y., ASSIGNORS TO LUCE CANE HARVESTER CORPORATION, OF NEW YORK, N. Y., A CORPORATION OF DELAWARE.

TOPPING DEVICE FOR SUGAR-CANE HARVESTERS.

Application filed August 3, 1922. Serial No. 579,394.

*To all whom it may concern:*

Be it known that we, FREDERICK C. DOUGLAS WILKES, a citizen of the Dominion of Canada, residing in New York, State of New York, and FRANCIS K. FLYNN, a citizen of the United States, residing in New York, State of New York, have invented certain new and useful Improvements in Topping Devices for Sugar-Cane Harvesters, of which the following is a specification.

This invention relates to improvements in sugar cane harvesters and the like, and particularly to the means for cutting off the green tops of the cane.

In harvesting sugar cane and preparing the same for the mill, it is necessary to cut off the green tops; and this invention has for its particular object to provide improved means for topping the cane in an efficient manner. This invention may be considered as an improvement upon the topping mechanism described and claimed in co-pending application for Letters Patent of George D. Luce, Serial No. 566,730, filed June 8, 1922. When so considered, the new features of the topping device reside in an improved form of fender, means for sweeping the ends of the cane into proper engagement with the fender, and an improved cutting knife, all of which features may be used either in combination with one another or separately. For the purpose of illustrating the invention, it is herein shown as applied to a cane harvester of the general form disclosed in the co-pending application for Letters Patent of George D. Luce, Serial No. 296,539, filed May 12, 1919; but it is to be understood that it is not limited to use with a harvester of this particular kind, since it is obviously applicable to machines of other types.

The invention will be understood from the following description taken in connection with the accompanying drawings in which Figure 1 is a side elevation, partly in section and somewhat diagrammatic in character, of a portion of a cane harvester having the invention embodied therein; Figure 2 is an end elevation, partly in section and somewhat diagrammatic, looking in the direction of the arrow 2 in Figure 1; Figure 3 is a view of the topping cutter; and Figure 4 is a section of the latter on the line 4—4 of Figure 3.

Referring to the drawings, the various parts of the portion of the harvester therein illustrated are mounted upon a fabricated steel frame 5, which may be of the form shown or of any other suitable form. Extending upwardly and rearwardly through this frame, are conveyor chains 6, 7 and 8, which are guided and yieldingly pressed toward one another by yielding presser guides 6', 7' and 8', so as to grip the cane between the chains and convey it in a standing position upwardly and rearwardly through the harvester.

Located above the conveyor chains, is a topping cutter having a plurality of topping knives 9 which are preferably bolted to a hub 10 as best shown in Figure 3. As shown in Figure 1, the knives 9, which are preferably slightly bent as shown so that they revolve in a dish-shaped path, cooperate with a fixed knife or blade 12 mounted in the frame. The hub 10 of the cutter is keyed to a shaft which instead of being perpendicular to the conveyor chains is slightly inclined forwardly. This shaft is mounted in the bearings 14 and 15 in the frame of the machine; and is connected by suitable gearing enclosed within the gear casing 16 with a shaft 18 carrying a sprocket wheel 20 driven by a chain 22 running over another sprocket wheel 23 driven by the engine which furnishes power to the harvester. The cutting knives 9, on their upper sides adjacent their cutting edges 25, are provided with upstanding ribs 26 which may be made integral with said knives or riveted thereto, as best shown in Figures 3 and 4. The topping cutter is rotated at high speed, and as the cane stalks are presented to it the tops are severed by the knives 9 in cooperation with the fixed blade 12; and the tops are thrown out at the side of the harvester by the engagement of the knife ribs 26 with the bottoms of the severed cane tops. Owing to the facts that the cutter knives 9 are bent and the cutter shaft is inclined forwardly, as hereinbefore mentioned, ample clearance is left between the knives at the rearward portion of their path and the ends of the topped cane stalks whereby nicking of the latter is obviated.

Mounted in the frame of the harvester and located adjacent the topping cutter, is a fender which preferably has three walls, 27, 28 and and 29, arranged as shown in Figures 1 and 3. From these figures, it will be apparent that the rear wall 27 is substantially vertical, but slopes backward slightly from the right to the left side of the machine; that the side wall 28 is substantially vertical and parallel to the conveyor chains and substantially perpendicular to the plane in which the topping cutter rotates; and that the top 29 of the fender is substantially parallel to the conveyor chains, but slopes upward slightly toward the left side of the harvester. In effect, therefore, the fender forms a pocket which is open at the bottom and front where the cane enters, and is open at the side where the tops of the cane are thrown out after being cut off by the topping cutter. By making the rear wall 27 and the top wall 29 of the fender diverge slightly instead of extending at right angles from the side wall 28, the friction between the cane tops and the wall 27 and top 29 of the fender while the tops are being ejected, is reduced to a minimum. In order to permit some regulation of the length of the cane tops which are cut off, for example when tops are desired for planting, the top 29 of the fender may be made adjustable vertically, in the manner indicated in Figure 1. From this figure it will be apparent that the top 29 is provided with downwardly extending portions which lie against the outsides of the rear wall 27 and the side wall 28. The top 29 may be held in any position by suitable means such as bolts 30 extending through holes in the side wall 28 and rear wall 27 and through vertical slots in the adjacent downwardly extending portions of the top 29.

In order to positively insure that the top of the cane will be directed into the pocket formed by the fender, we have provided what may be called sweeping means in the form of a belt 31 located above the conveyor chains and inclined rearwardly and downwardly with reference thereto. The sweeper belt 31 is shown as mounted on rolls or pulleys 32 and 33 journaled in the frame of the machine, the roller 33 being provided with a sprocket or pulley 34 carrying a chain or belt 35, running over sprocket or pulley 36 journaled in the frame and driven from the engine which supplies power to the harvester. The belt 31 is preferably provided with wipers 38 which extend across the face of the belt and are inclined rearwardly as shown in Figure 1. The belt 31 is driven in the direction of the arrow at a considerably higher speed than the conveyor chains 6, 7 and 8, and as the tops of the cane stalks engage the belt 31 they are thrown by the wipers 38 in a rearward direction, as shown in Figure 1, thereby insuring that the cane will be tipped in a rearward direction and that the tops of the cane will properly enter the pocket formed by the fender. In practice, it has been found that with conveyor chains driven at the rate of 291 ft. per minute, the function of the sweeper belt will be satisfactorily performed if the latter is driven at the rate of about 970 ft. per minute. It will be understood, however, that the sweeper belt may be driven at other speeds relative to the conveyor chains, as may be found desirable in practice.

Although the cane stalks handled by a harvester are of different lengths, the tops thereof which it is necessary to cut off are of substantially the same length. With the construction just described, the ends of all stalks no matter what the length of the latter may be, will enter the pocket formed by the fender, and tops of substantially the same length will be cut off. In the case of the longer cane stalks, the end of the stalk will be jammed into the upper end of the fender pocket and the stalk will be bent, as shown in Figure 1, until a portion of it passes into the path of the cutting knives 9; while in the case of shorter cane stalks, less or no bending of the stalk will occur. The general result will be that tops of substantially the same length will be cut from all of the stalks, which will give satisfactory results.

While we have described one preferred embodiment of our invention, it is to be understood that we are not to be limited to the precise construction shown and described, but that we intend to cover in the appended claims equivalent forms in which the invention may be embodied.

What we claim is:

1. In a machine of the character described, conveying means for conveying the cane, a rotating topping cutter, and a fender having a side portion arranged transversely to the plane of the cutter and substantially parallel to the path of the conveying means and having a top portion substantially parallel to the plane in which the cutter rotates.

2. In a machine of the character described, conveying means for conveying the cane, means for tilting the cane, a topping cutter, and a fender co-operating with the cutter, said fender arranged to intercept the tilted cane and having a top portion substantially parallel to the path of the conveying means and arranged to engage and bend over the cane tops prior to cutting of the latter.

3. In a machine of the character described, conveying means for conveying the cane, a rotatable topping cutter, and a fender adapted to engage the end of the cane stalks and two sides of said stalks at substantially right angles to one another, said fender being arranged in co-operative relation to said cutter whereby it causes the latter to cut off the tops of the cane at a substantially uniform distance from the upper ends thereof.

4. In a machine of the character described, conveying means for conveying the cane, a topping cutter rotating in a plane substantially parallel to the direction of movement of the conveying means, and a side fender having a portion arranged transversely to the plane of the cutter and substantially parallel to the path of the conveying means and having a top portion in a plane substantially parallel to the plane in which the cutter rotates.

5. In a machine of the character described, conveying means for conveying the cane, a topping cutter rotatable in a plane substantially parallel to the direction of movement of the conveying means, and a fender adapted to engage the ends of cane stalks and two sides of said stalks at substantially right angles to one another, said fender being arranged in co-operative relation to said cutter whereby it causes the latter to cut off the tops of the cane at a substantially uniform distance from the ends thereof.

6. In a machine of the character described, means for conveying the cane, a topping cutter, a fender co-operating with said cutter and arranged to engage and bend over the tops of the cane, and means for guiding and sweeping the ends of the cane into engagement with said fender.

7. In a machine of the character described, means for conveying the cane, a rotating topping cutter, a fender co-operating with said cutter and arranged to engage and bend over the tops of the cane, and a sweep belt arranged to guide and move the ends of the cane into engagement with the fender.

8. In a machine of the character described, conveying means for conveying the cane, a rotating topping cutter, and a three-walled fender arranged to be engaged by the ends of the cane.

9. In a machine of the character described, conveying means for conveying the cane, a topping cutter rotatable in a plane substantially parallel to the direction of movement of the conveying means, a three-walled fender adapted to be engaged by the ends of the cane, and means for sweeping the ends of the cane into co-operative relation with said fender.

10. In a machine of the character described, the combination of conveyor chains extending upwardly and rearwardly for conveying the cane in a standing position thru the machine, a topping cutter located above the conveyor chains in position to act upon cane fed by the chains, a fender co-operating with said cutter, and a sweep belt located above said conveyor chains and inclined rearwardly with reference thereto, arranged to sweep the ends of the cane into engagement with said fender.

11. In a machine of the character described, the combination of conveyor chains extending upwardly and rearwardly for conveying the cane in a standing position through the machine, a topping cutter located above the conveyor chains, and a fender co-operating with said cutter and having a substantially vertical rear wall extending in a plane transverse to said conveyor chains, a vertical side wall substantially parallel to said conveyor chains, and a top wall substantially parallel to said conveyor chains.

12. In a machine of the character described, a topping cutter having knives bent so as to revolve in a dish-shaped path, and a fixed blade co-operating with said knives.

13. In a machine of the character described, the combination of conveyor chains for conveying the cane in a standing position through the machine, and a topping cutter located above the conveyor chains and revolving on a shaft inclined forwardly from a line perpendicular to the conveyor chains.

14. In a machine of the character described, the combination of conveyor chains for conveying the cane in a standing position through the machine, and a topping cutter located above the conveyor chains and having knives bent so as to revolve in a dish-shaped path and mounted on a shaft inclined forwardly from a line perpendicular to the conveyor chains.

In testimony whereof we have affixed our signatures to this specification.

FREDERICK C. DOUGLAS WILKES.
FRANCIS K. FLYNN.